United States Patent Office 2,806,503
Patented Sept. 17, 1957

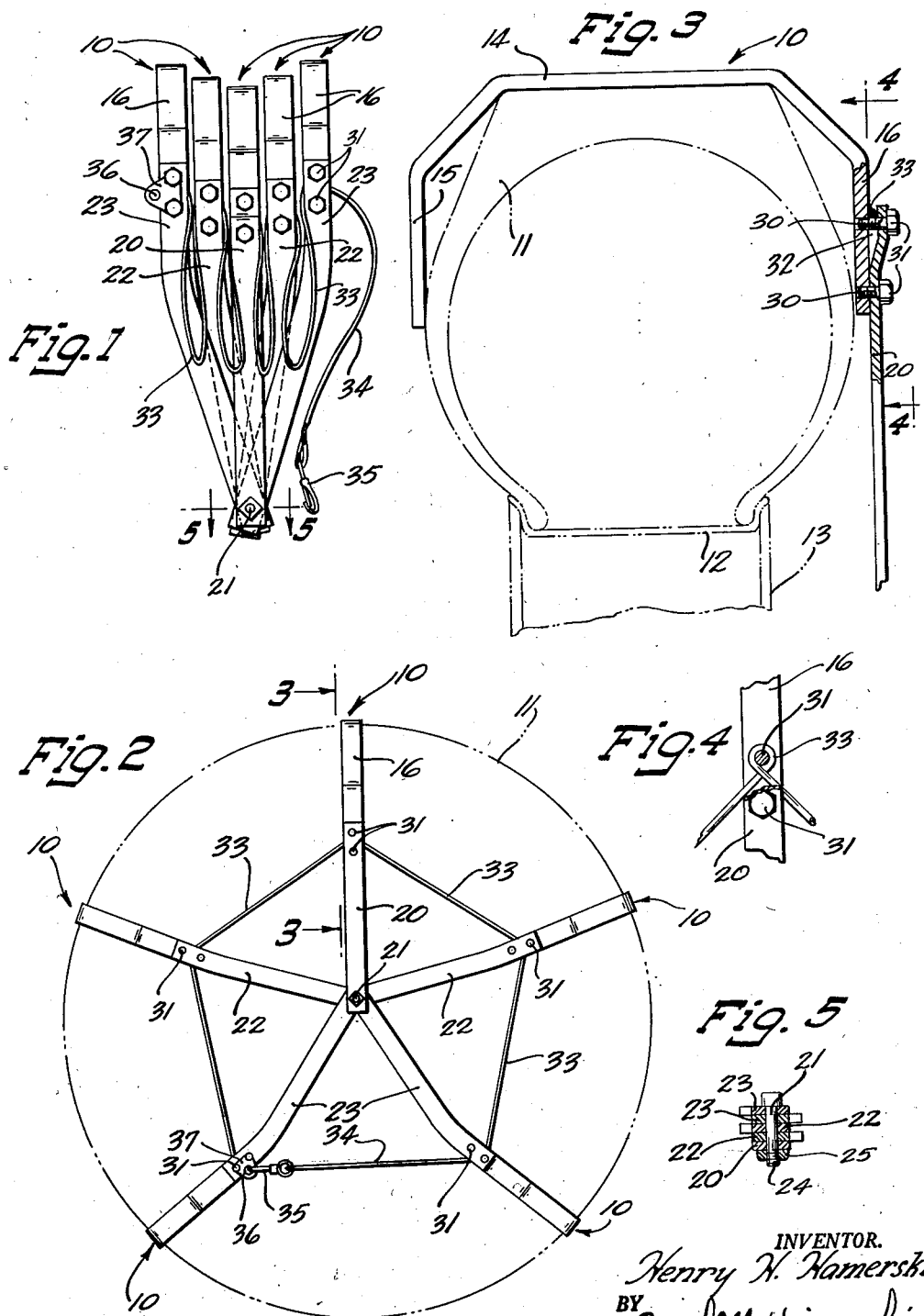

2,806,503

TRACTION DEVICE FOR VEHICULAR WHEELS

Henry H. Hamerski, Milwaukee, Wis.

Application October 24, 1955, Serial No. 542,344

9 Claims. (Cl. 152—225)

This invention relates generally to a traction device for vehicular wheels and more particularly to an improved traction device especially adapted to be conveniently attached over the rubber tires of the wheels of a vehicle.

Modern wheeled vehicles are supported on pneumatic tires mounted on wheels for the purpose of providing a smooth ride and are well adapted to grip the roads upon which they travel under normal operating conditions. However, these tires will not always provide adequate traction under unusual conditions, such as, for example, when the roads are covered with snow, sleet, or ice, or when the vehicle is required to traverse a muddy area. It is the usual practice to apply tire chains or straps over the tires to provide sufficient traction for overcoming these unusual conditions when encountered. The installation of both the tire chains and the straps is a dirty and difficult task requiring the operator to reach around to the inside of the tire, usually when the tire is wet after being stuck in the mud or snow. Tire chains furnish superior traction but are the most difficult to install, necessitating jacking up the car to render the entire periphery of the tire accessible. Furthermore, it is exceedingly difficult to tightly fit the chain about the tire and the cross links of the chain slap against the pavement when travelling on a road causing excessive breakage.

It is therefore a general object of the present invention to provide an improved traction device for installation on pneumatic tires of wheeled vehicles.

Another object of the present invention is to provide an improved traction device which can be conveniently installed on the rubber tired wheels of a vehicle without jacking up the vehicle to raise the wheels off of the road.

Another object of the present invention is to provide an improved traction device that can be installed with facility on the wheels of a vehicle.

Another object is to provide an improved traction device for the wheels of vehicles which can be collapsed so that it will occupy a minimum of storage space when not in use.

A further object is to provide an improved traction device for the rubber tired wheels of a vehicle that will inherently tightly grip the periphery of the tire when installed.

A further object is to provide an improved traction device for the rubber tired wheels of a vehicle that is of simple, economical, and sturdy construction but efficient in operation.

According to this invention the improved traction device comprises an odd number of lugs formed to overlie the exterior portion of the tire on which it is to be mounted. Each of the lugs is supported by an arm and all of the arms are pivotable about a single point that is located a slight distance off the center of the wheel. When the traction device is being installed on the wheel, its pivot point is disposed above the center of the wheel and it is applied to the wheel in its collapsed condition. The center arm is the shortest. The other arms are formed in pairs with one arm of each pair being located on either side of the center arm, and each succeeding pair of arms is slightly longer than the preceding pair of arms. With this arrangement it is only necessary to collapse the device by pivoting the arms so that they are in juxtaposition for the purpose of installing it on the tire. The lug attached to the short center arm is then placed on the top of the tire and the other arms are released to permit them to swing away from each side of the center arm until they strike the tire, which will prevent their further movement. The second pair will swing further away from each side of the center arm before their associated lugs strike the tire because of their added length. If a third pair of arms is provided they will likewise swing farther away from the center arm then the second pair is located from the center arm before the lugs of the third pair of arms will strike the tire. The several arms are connected together by a cable to securely attach the device to the wheel with the lugs being equally spaced about the periphery of the tire.

The foregoing and other objects of the invention which will become apparent from the following detailed specification setting forth an illustrative embodiment, may be achieved by the particular apparatus depicted in and described in connection with the accompanying drawings, in which:

Figure 1 is a view in front elevation illustrating a traction device incorporating the features of the present invention and shown in its collapsed condition;

Figure 2 is a view in front elevation depicting the apparatus illustrated in Figure 1 in its open condition as applied to a tire with the tire being indicated diagrammatically by a broken line;

Figure 3 is an enlarged fragmentary view in vertical section taken along the plane represented by the line 3—3 in Figure 2;

Figure 4 is a fragmentary detail view in vertical section taken along the plane represented by the line 4—4 in Figure 3 to illustrate the attachment of the cable to the arms; and Figure 5 is a detail view in horizontal section taken along the plane represented by the line 5—5 in Figure 1 to illustrate the connection of the several arms at their pivot point.

Reference is now made more particularly to the drawings and specifically to Figure 1 thereof illustrating a traction device incorporating the features of the present invention and shown in its collapsed condition. In the illustrated embodiment the apparatus is provided with five tire lugs 10 although any odd number of lugs may be employed to suit the particular conditions which may be encountered. It has been found in actual practice that five such lugs will function very efficiently to provide traction for the ordinary passenger automobile in negotiating hard surface roads which have been covered with snow, ice or sleet. Additional lugs may be found desirable for use on heavier vehicles or vehicles which may be expected to encounter severe muddy conditions.

In Figures 2 and 3 the traction device of the present invention is shown applied to a pneumatic tire 11 that is mounted on a rim 12 of a wheel 13. The lugs 10 are formed to extend across the periphery of the tire for the purpose of providing the necessary traction, and to this end are U-shaped with a flat bottom 14 that is placed across the exterior tread of the tire in direct contact therewith. One side 15 of the U extends laterally from the flat bottom 14 to engage the interior side wall of the tire 11 while the other side 16 of the U extends in a similar manner from the flat bottom 14 to engage the outer side wall of the tire.

Each of the lugs 10 is supported by a pivotable arm with the center lug 10, as shown in Figure 1, being supported by an arm 20 that is pivotable about a bolt or pin 21. The length of the arm 20 is such that the distance from the center of the pin 21 to the interior surface of the flat bottom 14 of its associated lug 10, is less than the radius of the tire 11. The other lug supporting arms are arranged in pairs with one arm of each pair on either side of the center arm 20 as shown in Figure 1. The first pair of arms is longer than the center arm 20 and each succeeding pair of arms is slightly longer than the preceeding pair of arms. Thus, in the illustrated embodiment, two arms 22 comprise the first pair of arms with one arm 22 on each side of the center arm 20. Each of the arms 22 also supports a lug 10 on its exterior end, and is also pivotably connected to the pin 21 as is the center arm 20.

In similar fashion, a second pair of arms is provided and comprises two arms 23 with one arm 23 on each side of the center arm 20 exteriorly of the first pair of arms 22 when the device is in its collapsed condition as shown in Figure 1. Each of the arms 23 likewise supports a lug 10 at one end, and is mounted for pivotable movement about the pin 21 at its opposite end. It is therefore apparent, that each of the arms 20, 22 and 23 is pivotably connected to the pin 21 at its end opposite the lug 10. The pin 21 is provided with a thread 24 for receiving a nut 25 to retain the several arms on the pin.

Each of the lugs 10 is attached to its cooperating arm 20, 22, or 23 in identical manner as shown in Figure 3, the end of the arms 20, 22 and 23 being provided with openings 30 for receiving screws 31 which are in threaded engagement with the sides 16 of the lugs 10. The ends of the arms 20, 22 and 23 are offset at their lug supporting end to form a recess 32 for receiving a cable 33 which is connected to each of the arms successively, in like manner, for the purpose of maintaining the proper spaced relationship of the arms when they are installed on the wheel in operating position. The cable 33 is wound about the uppermost screw 31 as illustrated in Figure 4, and clamped in that position by the tightening of the screw 31 into the threaded opening in the side 16 of the lug 10 so that the uppermost screw 31 serves not only to assist in attaching the arm 20, to the lug 10 but also operates to clamp the cable 33 in position. One end of the cable 33 is attached to one of the arms 23 as shown in Figure 1, and then it continues unbroken to connect the other arms to each other, being secured thereto in the manner described, with a length of cable 34 extending from the other of the pair of arms 23. The extending end of cable 34 is provided with a snap hook 35 adapted to engage an opening 36 formed in a bracket 37 to connect the two arms 23 together.

It will be noted from the drawings that the arms 22 and 23 are angled at their upper end with the angle of the arms 23 being somewhat greater than the angle of the arms 22. This arrangement is provided for the purpose of disposing the lugs 10 parallel to each other when they are in their collapsed position, as shown in Figure 1, to facilitate the installation of the device on a tire.

To install the apparatus on a tire, it is only necessary to grasp it while it is in its collapsed condition as shown in Figure 1, and set the center tire lug 10 on the top of the tire with the arms 20, 22 and 23 extending downwardly along the exterior of the wheel. With the center lug 10 in this position, centrally located on the wheel, the arms 22 and 23 may be released and they will fall outwardly away from the center arm 20 by reason of the fact that they are longer than the arm 20, and their associated lugs 10 are not in contact with the tire when they are disposed adjacent to the center lug 10. The arms 22 are of such a length that when they drop approximately 72° away from the center arm 20 in opposite directions, their associated lugs 10 will engage the tread of the tire 11, and the cable 33 between the arms 22 and the arm 20 will become taut.

Since the arms 23 are slightly longer than the arms 22, they will continue to pivot beyond the location of the arms 22, but will engage the tread of the tire 11 when spaced approximately 72° from the arms 22 by reason of the fact that their pivot point 21 is located above the axis of the wheel 13. When the lugs 10 that are mounted on the arms 23 have engaged the tread of the tire 11, the cable 33 between the arms 23 and the arms 22 will also become taut. When the five lugs 10 have been thus positioned about the periphery of the tire, in equally spaced relationship, it is only necessary to attach the snap hook 35 to the bracket 37 through its opening 36 to connect the two arms 23 together by the length of cable 34 to securely lock the device on the wheel. Since the cables 33 and 34 are taut between the several arms 20, 22 and 23, the arms are prevented from pivotable movement relative to each other.

It has been found that very little, if any, tension is placed upon the cable 33 when the vehicle is operated, because as the lugs 10 strike the surface upon which the vehicle is traveling they are forced tightly against the tire to prevent their slippage relative thereto. The cable 33 therefore functions to prevent pivotable movement of the arms 20, 22 and 23 relative to each other when their associated lugs 10 are free of the surface upon which the vehicle is operating. However, the cable is not subjected to severe tension, as would first appear, when the lugs 10 engage the surface with which the periphery of the tire 11 is in contact.

It is apparent therefore, from the above description, that the device may be very readily installed upon the tire of a vehicular wheel, it being unnecessary to touch the wheel or tire, or to raise it off of the road upon which it rests. Removal of the device from the wheel is also readily accomplished in a similar manner, it only being necessary to position the wheel with the short arm 20 located towards the top of the wheel. The snap hook 35 is then disengaged from the bracket 37 and the two arms 23 are moved upwardly towards the center arm 20. When the arms 23 reach the arms 22, the latter will move with them towards the center arm 20 to the collapsed condition as illustrated in Figure 1. It is then only necessary to lift the device off of the top of the tire to remove it therefrom.

From the foregoing detailed description of the structure and operation of the illustrative embodiment of the present invention, it will be apparent that a new and improved traction device has been provided for the rubber tired wheels of vehicles that is very efficient in operation and adaptable for a variety of conditions, and which may be very conveniently installed and removed from the wheel.

Although the illustrative embodiment of the invention has been described in considerable detail for the purpose of making a full disclosure of a practical operative arrangement by means of which the invention may be practiced, it is to be understood that various novel features of the invention may be incorporated in other arrangements without departing from the spirit and scope of the invention, as defined in the subjoined claims.

The principles of the invention having now been fully explained in connection with the foregoing description of the illustrative embodiment, the invention is hereby claimed as follows:

1. In a traction device for vehicular wheels; a pin; a center arm having one end secured to said pin; one or more pairs of arms in pivotal engagement with said pin at one end with an arm of each pair disposed successively on each side of said center arm; a lug secured to said center arm and adapted to extend over the periphery of the wheel with the distance from said pin to the wheel periphery engaging surface of said lug being less than the radius of the wheel, and a lug adapted to extend over the periphery of the wheel secured to each of the arms that are arranged in pairs with the lugs on the first pair of arms having surfaces that engage the periphery of the wheel located a greater distance from said pin than the wheel periphery engaging surface of the lug on said center arm is located from said pin and the lugs on the succeeding pairs of arms having surfaces that engage the periphery of the wheel located a greater distance from said pin than the wheel periphery engaging surfaces of the lugs on the preceding pair of arms are located from the pin; whereby the several arms and their associated lugs may be pivoted toward the center arm to dispose them in juxtaposition, or they may be pivoted outwardly of said center arm about the periphery of a wheel so that the lugs may engage the periphery of the wheel at substantially equal intervals to provide the desired traction.

2. In a traction device for vehicular wheels; a pin; a center arm having one end secured to said pin; one or more pairs of arms in pivotal engagement with said pin at one end with an arm of each pair disposed successively on each side of said center arm; a lug secured to said center arm and adapted to extend over the periphery of the wheel with the distance from said pin to the wheel periphery engaging surface of said lug being less than the radius of the wheel; a lug adapted to extend over the periphery of the wheel secured to each of the arms that are arranged in pairs with the lugs on the first pair of arms having surfaces that engage the periphery of the wheel located a greater distance from said pin than the wheel periphery engaging surface of the lug on said center arm is located from said pin and the lugs on the succeeding pairs of arms having surfaces that engage the periphery of the wheel located a greater distance from said pin than the wheel periphery engaging surfaces of the lugs on the preceding pair of arms are located from the pin so that the several arms may be pivoted away from said center arm about the periphery of a wheel to engage the lugs with the periphery of the wheel at substantially equal intervals; and a cable attached to each of said arms successively to prevent the arms from pivoting toward said center arm and thereby retain the lugs in position about the periphery of the wheel.

3. In a traction device for vehicular wheels; a pin; a center arm having one end secured to said pin; one or more pairs of arms in pivotal engagement with said pin at one end with an arm of each pair disposed successively on each side of said center arm; a lug secured to said center arm and extending laterally therefrom in position to engage the periphery of the wheel with the distance from said pin to the wheel periphery engaging surface of said lug being less than the radius of the wheel; a lug secured to each of the arms that are arranged in pairs and extending laterally therefrom in position to engage the periphery of the wheel with the lugs on the first pair of arms having surfaces that engage the periphery of the wheel located a greater distance from said pin than the wheel periphery engaging surface of the lug on said center arm is located from said pin, and the lugs on the succeeding pairs of arms having surfaces that engage the periphery of the wheel located a greater distance from said pin than the wheel periphery engaging surfaces of the lugs on the preceding pair of arms are located from the pin so that the several arms may be pivoted away from said center arm about the periphery of a wheel to engage the lugs with the periphery of the wheel at substantially equal intervals; a length of cable connected between each of two adjacent arms, said cable being of a length so that it is taut when the arms are in operating position with each of the lugs engaging the periphery of the wheels; and a latch operable to connect and disconnect an end of one of said lengths of cable to its associated arm; whereby the cable functions to prevent the arms from pivoting toward said center arm and thereby retain the lugs in position about the periphery of the wheel but may be rendered inoperable by disconnecting said latch to enable the arms to be pivoted toward said center arm for removing the device from the wheel.

4. In a traction device for vehicular wheels; a pin; a center arm having one end secured to said pin, a first pair of arms in pivotal engagement with said pin at one end with one arm of said pair disposed on one side of said center arm and the other arm of said pair disposed on the other side of said center arm; a second pair of arms in pivotal engagement with said pin at one end with one arm of said second pair being disposed to the side of an arm of said first pair away from the center arm and the other arm of said second pair being disposed to the side of the other arm of said first pair away from said center arm; a lug secured to said center arm and extending laterally therefrom in position to engage the periphery of the wheel with the distance from said pin to the wheel periphery engaging surface of said lug being less than the radius of the wheel; a lug secured to each of said first pair of arms and extending laterally therefrom in position to engage the periphery of the wheel, said lugs on said first pair of arms having surfaces that engage the periphery of the wheel located a greater distance from said pin than the wheel periphery engaging surface of the lug on said center arm is located from said pin; and a lug secured to each of said second pair of arms and extending laterally therefrom in position to engage the periphery of the wheel, said lugs on said second pair of arms having surfaces that engage the periphery of the wheel located a greater distance from said pin than the wheel periphery engaging surfaces of the lugs on said first pair of arms are located from said pin; whereby the several arms and their associated lugs may be pivoted toward the center arm to dispose them in juxtaposition, or they may be pivoted away from said center arm about the periphery of a wheel and the lugs will engage the periphery of the wheel at substantially equal intervals by reason of the varying lengths of their supporting arms.

5. In a traction device for vehicular wheels; a pin; a center arm having one end secured to said pin; a first pair of arms in pivotal engagement with said pin at one end with one end of said pair disposed on one side of said center arm and the other arm of said first pair disposed on the other side of said center arm; a second pair of arms in pivotable engagement with said pin at one end with one arm of said second pair being disposed to the side of an arm of said first pair away from the center arm and the other arm of said second pair being disposed to the side of the other arm of said first pair away from said center arm; a lug secured to said center arm and extending laterally therefrom in position to engage the periphery of the wheel with the distance from said pin to the wheel periphery engaging surface of said lug being less than the radius of the wheel; a lug secured to each of said first pair of arms and extending laterally therefrom in position to engage the periphery of the wheel, said lugs on said first pair of arms having surfaces that engage the periphery of the wheel located a greater distance from said pin than the wheel periphery engaging surface of the lug on said center arm is located from said pin; a lug secured to each of said second pair of arms and extending laterally therefrom in position to engage the periphery of the wheel, said lugs on said second pair of arms having surfaces that engage the periphery of the wheel located a greater distance from said pin than the wheel periphery engaging surfaces of the lugs on said first pair of arms are located from paid pin; and a cable attachable to each of said arms successively to prevent the arms from pivoting toward said center arm and thereby retain the lugs in position about the periphery of the wheel.

6. In a traction device for rubber tired vehicular wheels; a pin located along one face of the wheel with its axis offset from the axis of the tires; a plurality of arms pivotally connected to said pin; and a lug on each of said arms extending laterally therefrom in position to engage the periphery of the tire, said lugs having their tire periphery engaging surfaces located different distances from said pin so that they engage the periphery of the tire at substantially equal intervals even though the pin is offset from the axis of the tire; whereby the arms may be pivoted about the pin away from each other to position the lugs along the periphery of the tire or they may be pivoted about the pin toward each other to place them in juxtaposition for removing the device from the tire.

7. In a traction device for rubber tired vehicular wheels; a pin located along a face of the wheel with its axis offset from the axis of the tire, a plurality of arms pivotally connected to said pin, a lug on each of said arms extending laterally therefrom in position to engage the periphery of the tire, said lugs having their tire periphery engaging surfaces located different distances from said pin so that they engage the periphery of the tire at substantially equal intervals even though the pin is offset from the axis of the tire; and a cable attachable to each of said arms successively to prevent them from pivoting about said pin after they are installed on a wheel and thereby retain the lugs in position about the periphery of the tire.

8. In a traction device for rubber tired vehicular wheels; a pin located along a face of the wheel with its axis offset from the axis of the tire; a plurality of arms pivotally connected to said pin, a lug on each of said arms extending laterally therefrom in position to engage the periphery of the tire, said lugs having their tire periphery engaging surfaces located different distances from said pin so that they engage the periphery of the tire at substantially equal intervals even though the pin is offset from the axis of the tire; a length of cable connected between each of two adjacent arms, said cable being of a length so that it is taut when the arms are in operating position with each of the lugs engaging the periphery of the wheel; and a latch operable to connect and disconnect an end of one of said lengths of cable to its associated arm; whereby the cable functions to prevent the arms from pivoting toward each other and thereby retains the lugs in operating position about the periphery of the tire.

9. In a traction device for rubber tired vehicular wheels; a pin located along a face of the wheel with its axis offset from the axis of the tire; a plurality of arms pivotally connected to said pin; a lug on each of said arms extending laterally therefrom in position to engage the periphery of the tire, said lugs having tire periphery engaging surfaces located different distances from said pin so that they engage the periphery of the tire at substantially equal intervals even though the pin is offset from the axis of the tire; and attaching means connectable to each of said arms successively to prevent them from pivoting about said pin after they are installed on a wheel and thereby retain said lugs in position about the periphery of the tire.

References Cited in the file of this patent

UNITED STATES PATENTS

| | | |
|---|---|---|
| 1,846,335 | Hughes | Feb. 23, 1932 |
| 2,582,193 | Dowdell | Jan. 8, 1952 |